(12) United States Patent
Zheng et al.

(10) Patent No.: US 9,167,544 B2
(45) Date of Patent: Oct. 20, 2015

(54) DEVICE TO DEVICE SYNCHRONIZATION METHOD APPLICABLE TO USER EQUIPMENT AND USER EQUIPMENT USING THE SAME

(71) Applicants: Industrial Technology Research Institute, Hsinchu (TW); National Taipei University, New Taipei (TW)

(72) Inventors: Yan-Xiu Zheng, Hsinchu County (TW); Chun-Yi Wei, New Taipei (TW)

(73) Assignees: Industrial Technology Research Institute, Hsinchu (TW); National Taipei University, New Taipei (TW)

( * ) Notice: Subject to any disclaimer, the term of this patent is extended or adjusted under 35 U.S.C. 154(b) by 0 days.

(21) Appl. No.: 14/572,783

(22) Filed: Dec. 17, 2014

(65) Prior Publication Data

US 2015/0215883 A1    Jul. 30, 2015

Related U.S. Application Data

(60) Provisional application No. 61/932,263, filed on Jan. 28, 2014.

(51) Int. Cl.
*H04W 56/00* (2009.01)
*H04W 52/30* (2009.01)
(Continued)

(52) U.S. Cl.
CPC ............ *H04W 56/001* (2013.01); *H04W 52/30* (2013.01); *H04W 52/383* (2013.01); *H04W 56/0015* (2013.01); *H04W 88/06* (2013.01)

(58) Field of Classification Search
CPC . H04W 56/001; H04W 52/383; H04W 53/30; H04W 88/06; H04W 24/10; H04W 56/00

USPC ............ 455/426.1, 502, 552.1; 370/329, 343, 370/216; 340/572.1; 375/152, 365
See application file for complete search history.

(56) References Cited

U.S. PATENT DOCUMENTS

| 7,103,124 B1 | 9/2006 | Lindskog et al. |
| 8,213,405 B2 | 7/2012 | Horn et al. |

(Continued)

FOREIGN PATENT DOCUMENTS

| EP | 0766415 | 4/1997 |
| TW | 201433199 | 8/2014 |
| WO | 2014105388 | 7/2014 |

OTHER PUBLICATIONS

"Office Action of Europe Counterpart Application", issued on Jun. 25, 2015, p. 1-p. 7.

(Continued)

*Primary Examiner* — Phuoc H Doan
(74) *Attorney, Agent, or Firm* — Jianq Chyun IP Office

(57) ABSTRACT

The present disclosure provides a device to device (D2D) synchronization method that is applicable to a user equipment and a user equipment (UE) using the same method. In one of the exemplary embodiments, the D2D synchronization method includes receiving detected signals from a receiver, obtaining from the detected signals a first signal having a first timing information and a second signal having a second timing information, determining whether to forward the first timing information or the second timing information based on an upper bound power restriction of the first signal and the second signal and a power difference between the first signal and the second signal, and determining whether to transmit a third timing information that is inherent of the UE based on whether the first signal and the second signal are below power thresholds.

20 Claims, 13 Drawing Sheets

(51) Int. Cl.
  *H04W 52/38* (2009.01)
  *H04W 88/06* (2009.01)

(56) References Cited

U.S. PATENT DOCUMENTS

| | | | |
|---|---|---|---|
| 8,730,938 B2 | 5/2014 | Gheorghiu et al. | |
| 8,787,954 B2 | 7/2014 | Richardson et al. | |
| 2006/0030343 A1 | 2/2006 | Ebner et al. | |
| 2009/0286564 A1* | 11/2009 | Ho | 455/502 |
| 2013/0185373 A1 | 7/2013 | Vandwalle et al. | |
| 2013/0316762 A1* | 11/2013 | Charbit et al. | 455/552.1 |
| 2014/0140456 A1 | 5/2014 | Tavildar et al. | |
| 2014/0171062 A1 | 6/2014 | Fallgren et al. | |
| 2014/0185495 A1 | 7/2014 | Kuchibhotla et al. | |

OTHER PUBLICATIONS

Lee et al., "A Carrier Frequency Synchronization Method for Device-to-Device Communication Network," 2013 19th Asia-Pacific Conference on Communications (APCC), Aug. 29-31, 2013, pp. 239-244.

Lee et al., "A Fine Timing Synchronization Method on Group Communication System Enablers for LTE," 2013 19th Asia-Pacific Conference on Communications (APCC), Aug. 29-31, 2013, pp. 21-25.

Jiang et al., "Research of Synchronization and Training Sequence Design for Cooperative D2D Communications Underlaying Hyper-Cellular Networks," 2013 IEEE International Conference on Communications Workshops (ICC), Jun. 9-13, 2013, pp. 271-275.

Kim et al., "Design of Synchronization Preambles for LTE-Advanced D2D Communications," 2014 Sixth International Conference on Ubiquitous and Future Networks (ICUFN), Jul. 8-11, 2014, pp. 138-139.

Sun et al., "Distributed Clock Synchronization With Application of D2D Communication Without Infrastructure," 2013 IEEE Globecom Workshops (GC Wkshps), Dec. 9-13, 2013, pp. 561-566.

Chao et al., "Bio-Inspired Proximity Discovery and Synchronization for D2D Communications," IEEE Communications Letters, Dec. 2013, pp. 2300-2303.

* cited by examiner

DEVICE TO DEVICE SYNCHRONIZATION METHOD APPLICABLE TO USER EQUIPMENT AND USER EQUIPMENT USING THE SAME

CROSS REFERENCE TO RELATED APPLICATION

This application claims the priority benefit of U.S. provisional application Ser. No. 61/932,263, filed on Jan. 28, 2014. The entirety of the above-mentioned patent application is hereby incorporated by reference herein and made a part of specification.

TECHNICAL FIELD

The present disclosure is related to a device to device synchronization method that is applicable to a user equipment and a user equipment using the same method.

BACKGROUND

Device to Device (D2D) communication may refer to a communication method in a wireless communication system for a user equipment (UE) to directly communicate with another UE. Conventionally, whenever a UE transmits a message to another, a base station or an evolved Node B (eNB) in the case of LTE would relay the message in between the two UEs. But for the D2D communication, the involvement of the eNB has been minimized as user messages of the two UEs could be delivered directly from the one UE to the other.

However, in order to for D2D devices to be synchronized to a network or to another peer device, D2D synchronization information may be delivered either from the network or from a peer device to each individual UE. Hence, a synchronization source (SS) could be utilized to transmit a D2D synchronization signal (D2DSS) to enhance the network synchronization. When a network implements synchronous D2D communication as opposed to asynchronous D2D communication in which a device would blindly search for another device, all D2D devices could be required to be aligned to the network timing according to a synchronization signal.

Therefore, at least two different types of apparatuses could serve as a synchronization source. Conventionally, an eNB may serve as a synchronization source by periodically transmitting system information in which a primary synchronization signal (PSS) and a secondary synchronization signal (SSS) are located. When the PSS/SSS have been received, a D2D UE may align its timing with the timing of the eNB. Also, another peer device could also serve as a synchronization source. In particular, any D2D UE may transmit a D2DSS that can be received by another D2D UE as a synchronization source.

In order to design a D2D synchronization scheme, several issues would need to be considered. First, a D2D device may simultaneously receive several synchronization signals at once. In that case, a D2D device would be considered with whom the D2D device would synchronize itself to. If the D2D device chooses the wrong device to follow, the timing of the D2D device could be misaligned. Also, there could be a timing confusion in the case when a D2D device receives two or more timing references that are different. In that case, the D2D device would not know which timing reference it should follow. Secondly, after a D2D device selects a timing reference, the D2D device may not necessarily have to forward the timing reference as selected.

In any case, a D2D synchronization method could be designed to ensure the reliability of network timing and to minimize potential timing confusions.

SUMMARY OF THE DISCLOSURE

Accordingly, the present disclosure is directed to a device to device (D2D) synchronization method that is applicable to a user equipment and a user equipment (UE) using the same method.

In one of the exemplary embodiments, the present disclosure is directed to a D2D synchronization method that includes receiving detected signals from a receiver, obtaining from the detected signals a first signal having a first timing information and a second signal having a second timing information, determining whether to forward the first timing information or the second timing information based on an upper bound power restriction of the first signal and the second signal and a power difference between the first signal and the second signal, and determining whether to transmit a third timing information that is self-generated by the UE based on whether all detected signals are below power thresholds.

In one of the exemplary embodiment, the present disclosure is directed to a user equipment that includes a transmitter for transmitting wireless signal, a receiver for receiving wireless signal, and a processing circuit coupled to the transmitter and the receiver and is configured for receiving detected signals from the receiver, obtaining from the detected signals a first signal having a first timing information and a second signal having a second timing information, forwarding the first timing information or the second timing information based on an upper bound power restriction of the first signal and the second signal and a power difference between the first signal and the second signal, and transmitting through the transmitter a third timing information that is inherent to the UE in response to all detected signals being below power thresholds.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
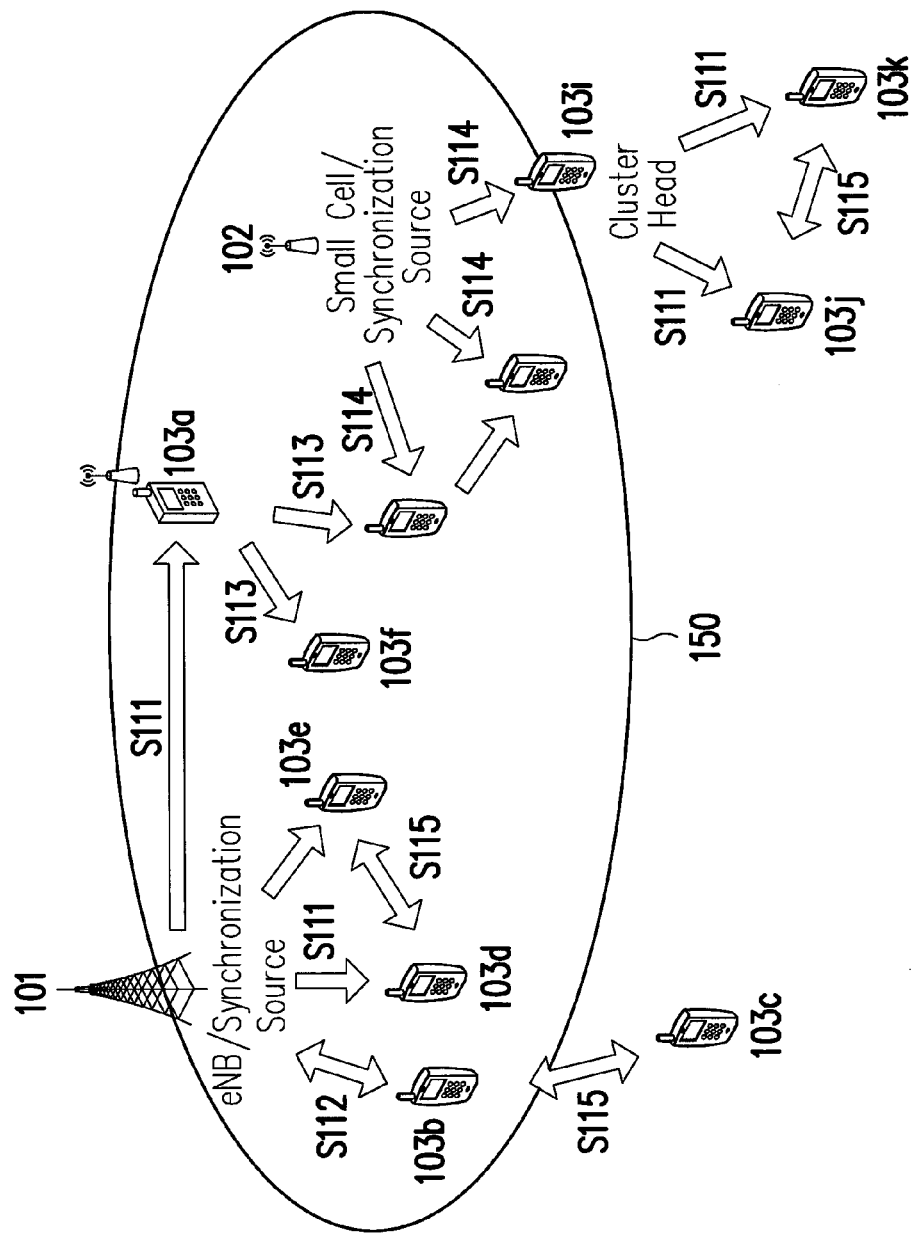
FIG. 1 illustrates an exemplary wireless communication system that possesses D2D capability.

Reference will now be made in detail to the present exemplary embodiments of the disclosure, examples of which are illustrated in the accompanying drawings. Wherever possible, the same reference numbers are used in the drawings and the description to refer to the same or like parts.

To implement a wireless communication system that is capable of synchronous D2D communication, maintaining synchronizations among UEs in a wireless network would be essential. Therefore, in order to provide synchronization for D2D UEs by a wireless network, especially for UEs that are near the edge or outside of the coverage of the wireless network, the present disclosure proposes a device to device (D2D) synchronization method that is applicable to a user equipment as well as a user equipment (UE) that uses the same method which involves selecting a synchronization source and forwarding the timing reference provided by the synchronization source. By utilizing the proposed method and device, the reliability of the D2D aspect of a wireless network is enhanced as timing misalignments and timing confusions would be minimized. Also, the range of the D2D communication of a wireless network could be extended without concerning for the loss of synchronization of UEs near the border or outside of the coverage of the wireless network.

FIG. 1 illustrates an exemplary wireless communication system that possesses D2D capability. The exemplary wireless communication system 100 would include at least one eNB 101 that serves as a base station synchronization source per cell and a group of UEs 103a~103k which are served by the eNB 101. The UEs 103a~103k may include a D2D UE 103a that transmits a discovery signal as denoted by S113 and also a UE that serves as a cluster head. The cell may also include at least one small cell base station 102. The wireless communication system 100 may provide a conventional cellular communication as denoted by S112 through the eNB 101 to any UEs such as UE 103b, and the wireless communication system 100 may also allow UEs 103a~103k to engage in D2D communications as denoted by S115. The wireless network 100 may provide synchronization for D2D communication by transmitting control signaling as denoted by S111 either from the eNB 101 or from a cluster head UE 103i. The small cell 102 may also serve as a synchronization source by transmitting D2D synchronization signal as denoted by S114.

When any of the UEs 103a~103k moves within the wireless range 150 of the eNB 101, the UE would be considered within the network coverage. Otherwise, when any of the UEs 103a~103k moves outside of the wireless range 150 of the eNB 101, the UE would be considered to be outside of the network coverage. However, when a UE is outside of the network coverage, another UE may serve as a relay for the UE that is outside of the network coverage. For example, the UE 103b may serve as a relay for UE 103c by delivering user data from the eNB 101 to the UE 103c. For UEs outside of the network coverage, another UE may also serve as a cluster head that forwards network timing alignment information for UEs outside of the network coverage. For example, UE 103i may serve as a cluster head for UE 103j and UE 103k. However, if a UE receives synchronization information from multiple synchronization sources simultaneously, a timing confusion may occur.

Figure 2:
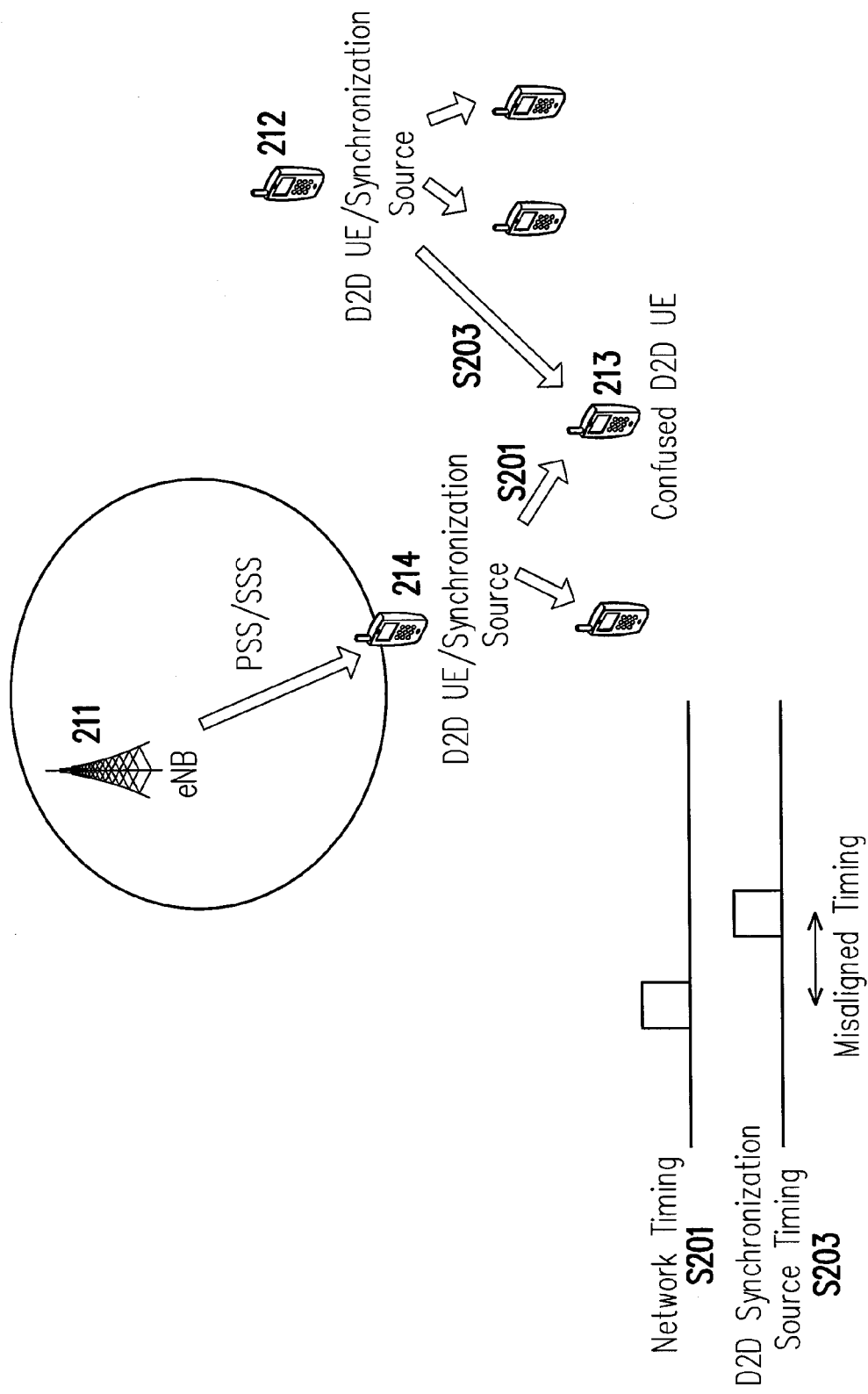
FIG. 2 illustrates a potential timing confusion of a synchronous D2D wireless communication system.

FIG. 2 illustrates the situation of a timing confusion of a synchronous D2D wireless communication system. In FIG. 2, a D2D UE 213 may receive a network timing information from a first D2D UE synchronization source 214 in step S201 and a second D2D UE synchronization source 212 in step S203 at the same time. Although the first D2D UE synchronization source 214 could be synchronized with the eNB 211, the second D2D UE synchronization source 212 that is outside of the coverage of the eNB 211 could provide a different timing information from the first D2D UE synchronization source 214 and thus a timing confusion may occur for the timing confused D2D UE 213. Thus, in order to avoid the timing confusion, a UE would need to know what synchronization source to align its own timing to. Also, in order to extend the range of the D2D communication of a wireless network, a UE may also need to know when to act as a timing forwarder which receives a timing alignment information and forwards the timing alignment information to other devices that could be near the boundary of a network coverage or outside the boundary of the network coverage.

Figure 3A:
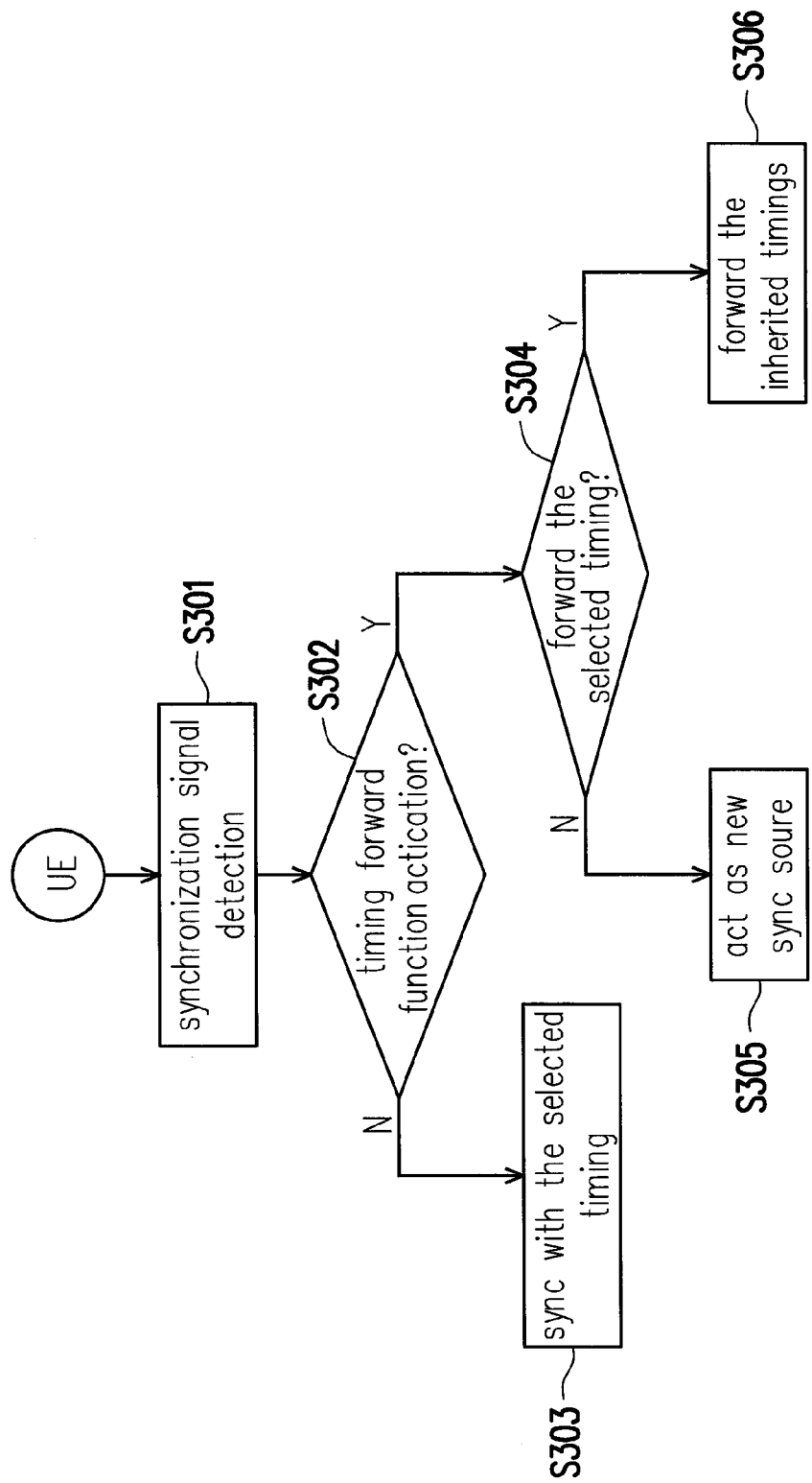
FIG. 3A illustrates a proposed device to device synchronization method in accordance with one of the exemplary embodiments of the present disclosure.

FIG. 3 illustrates a proposed process of timing selection and timing forward in accordance with one of the exemplary embodiments of the present disclosure. In step S301, a UE would perform detections for one or more synchronization sources in order to align its own timing to one of the detected synchronization sources. In detail, upon one or more synchronization signals being detected from the one or more synchronization sources, the UE may select what synchronization signal to synchronize its own timing to base on a designated metric. For example, a designated metric could be detected average power within a time period such that the UE would align its own timing to one synchronization signal that has the highest average power within a time period. The aforementioned average power within a time period may refer to, for example, the reference signal received power (RSRP) of a signal. For another example, a designated metric could also be the relative distance between a synchronization source and the UE.

In step S302, a UE would determine whether the timing forward function has been activated. When the timing forward function has been activated, the UE would forward the timing information of the selected synchronization source to another device. The activation of the timing forward function could be based on an upper bound restriction of a designated metric of the selected synchronization source and a difference of the designated metric between the selected synchronization source and another external synchronization source. When the upper bound restriction is satisfied and the difference of the designated metric exceeds a threshold, the timing forward function of the UE would be activated. For example, if the designated metric is detected average power within a time period, then a UE may decide whether the upper bound power restriction is satisfied, i.e. the detected average power of the synchronization signal of the selected synchronization source is smaller than a first edge power threshold or not, and a UE may also decide whether the difference of detected average powers between the selected synchronization source and another synchronization source exceeds a second edge power threshold. The another synchronization source could be a synchronization source that has the highest detected average power within a time period other than the selected synchronization source. When the upper bound power restriction is satisfied and the second edge power threshold has been exceeded by the difference of the detected powers, then the UE may serve as a timing forwarder so as to forward timing alignment information from the selected synchronization source to another external device. The above mentioned two edge power thresholds are non-zero positive numbers and would likely vary for difference scenarios.

Figure 3B:
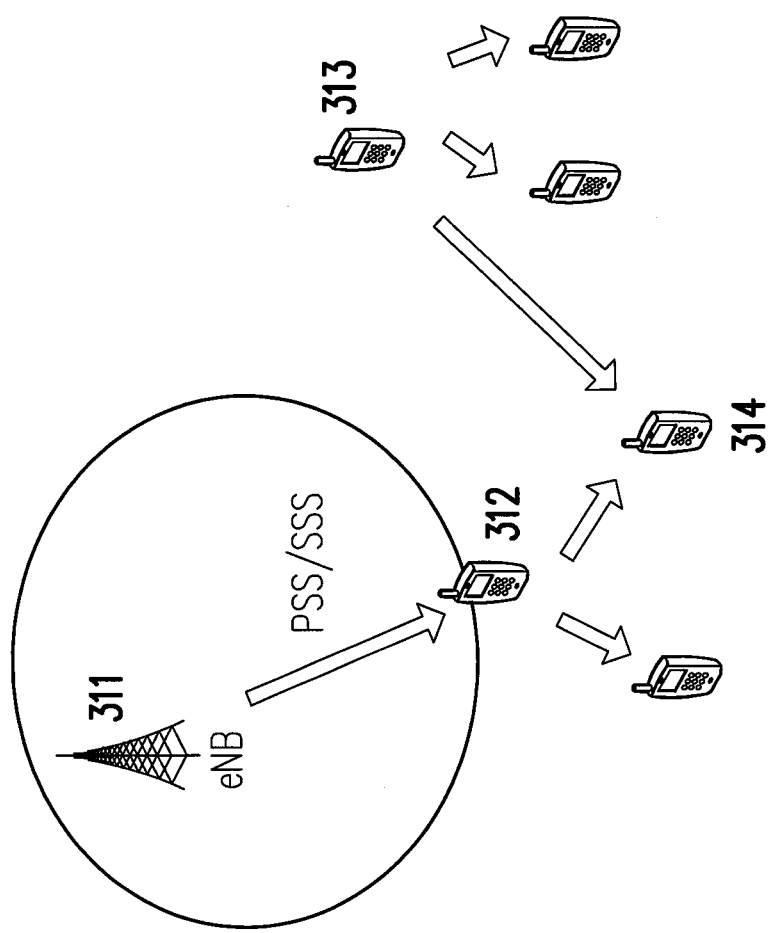
FIG. 3B~3C provide two different examples that further elucidate the concept disclosed by FIG. 3A.
Figure 3C:
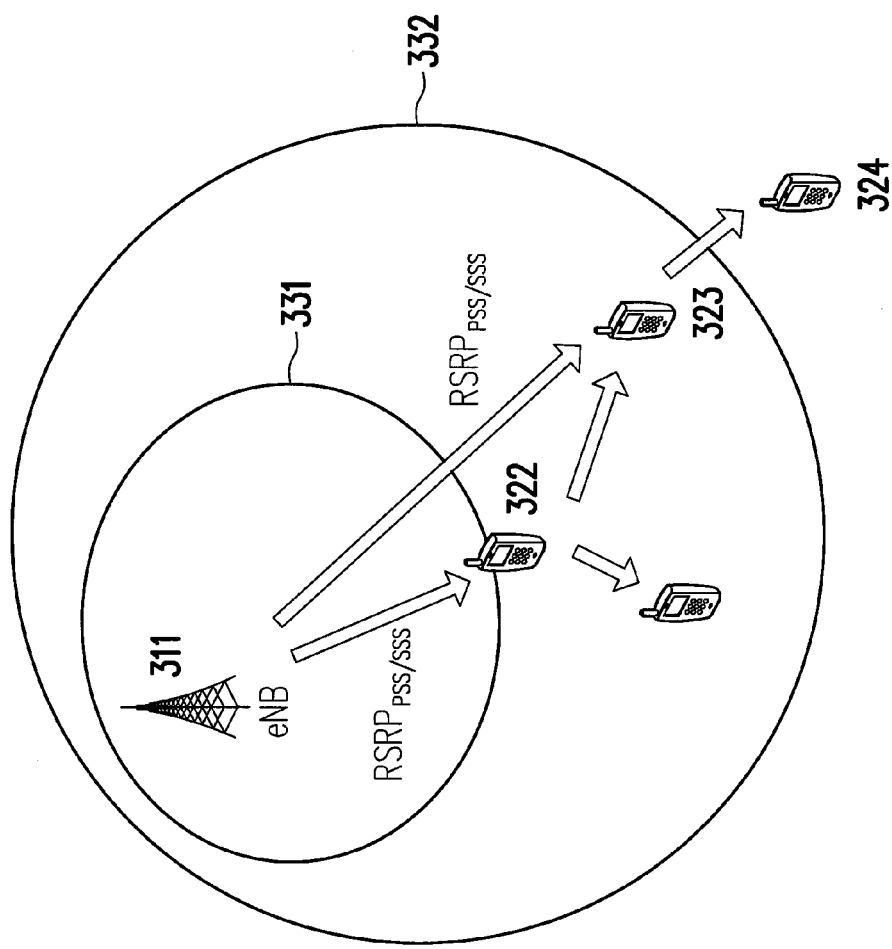

In step S303, if the timing forward function of the UE has not been activated, then the UE would only synchronized with the selected synchronization source. However, if the timing forward function of the UE has been activated, then the process moves to step S304. In step S304, the UE would further determine whether the timing alignment information of the selected synchronization source would actually be forwarded or instead the UE would act as an independent synchronization source for other devices. In general, if the UE does not synchronize to any detected synchronization source, for example the all detected signal powers are below power thresholds, the UE would act as an independent synchronization source for other devices. In step S305, assuming that the UE cannot align its timing to any detected synchronization source, then the UE would act as an independent synchronization source. In step S306, assuming that the UE is able to align its timing to a selected synchronization source, then the UE would forward the timing alignment information to other devices. FIGS. 3B and 3C provide two different examples that serve to further elucidate the concept of FIG. 3A.

In FIG. 3B, suppose that an eNB 311 broadcasts system information that includes a PSS and SSS to a UE 312 situated at the edge of the transmission range of the eNB 311, the UE 312 may serve as a synchronization source by proxy for the eNB 311 by forwarding the timing alignment information embedded in the PSS and SSS to a UE such as UE 314 that is outside of the coverage of the eNB 311. However, for the UE 312 that is at the edge of the transmission range of the eNB 311, the PSS and SSS received from the eNB 311 would be reliable. If the PSS and SSS are not reliable, then a UE would be treated as UE 313 that is outside of the coverage of the eNB 311. The UE 313 would then act as an independent synchronization source by transmitting D2DSS to UEs within the coverage of the UE 313.

FIG. 3C is another example that further elucidates FIG. 3B with more details. In the example of FIG. 3C, the eNB 311 would broadcast system information signal that includes PSS and SSS. Within the first broadcast range 331 of the eNB 311, the RSRP of the system information signal would exceed the first edge power threshold and the upper bound power restriction is not satisfied. Any UE that is within the first broadcast range 331 would not relay the timing alignment information of the eNB 311 as provided by the PSS and SSS to other UEs. However, if a UE that is outside of the first broadcast range 331, the UE would be considered to be at the boundary of the broadcast range of the eNB 311 and may relay the timing information of the eNB 311 to other UEs. Since UE 322 is just right outside of the first broadcast range 331, the UE 322 would relay timing alignment information to the UE 323. If a UE is outside of the first broadcast 331 but is within the second broadcast range 332, the UE would be considered to have received sufficiently reliable timing alignment information so that the UE may relay timing alignment information to other UEs. The region between the first broadcast range 331 and the second broadcast range 332 could be defined as the area where the RSRP of the system information signal received by a UE is below the first edge power threshold, but the RSRP of the system information signal received by the same UE is above a third edge power threshold, where the first edge power threshold is larger than the third edge power threshold, and both the two edge power thresholds are non-zero numbers. If a UE falls outside of the second broadcast range 332, then the UE does not have sufficiently reliable timing alignment information so that the UE would not forward time alignment information to other UEs. For example, while the UE 323 in FIG. 3C is within the second broadcast range 332 and may supply timing alignment information to the UE 324 by transmitting D2DSS that is aligned to the network, the D2DSS received by UE 324 might be below the third edge power threshold so that the UE 324 may not forward timing alignment information to other UEs. FIG. 4~FIG. 7 provides further details for the proposed D2D synchronization method by exploring various exemplary scenarios.

Figure 4A:
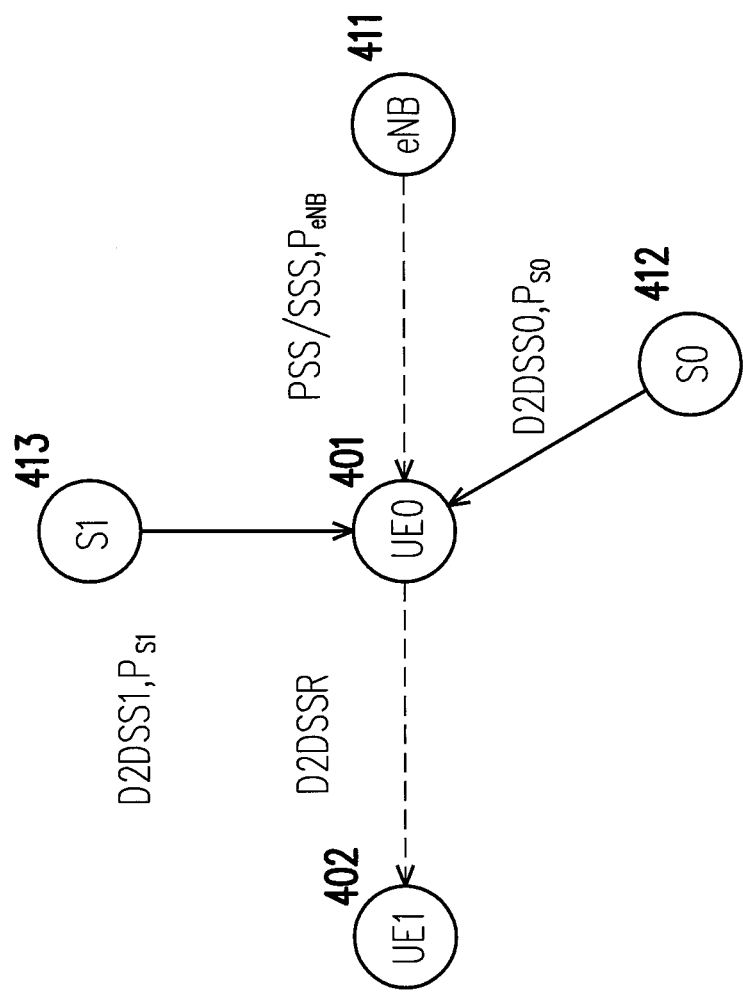
FIG. 4A~4C illustrates a first exemplary scenario of the proposed device to device synchronization method.
Figure 4B:
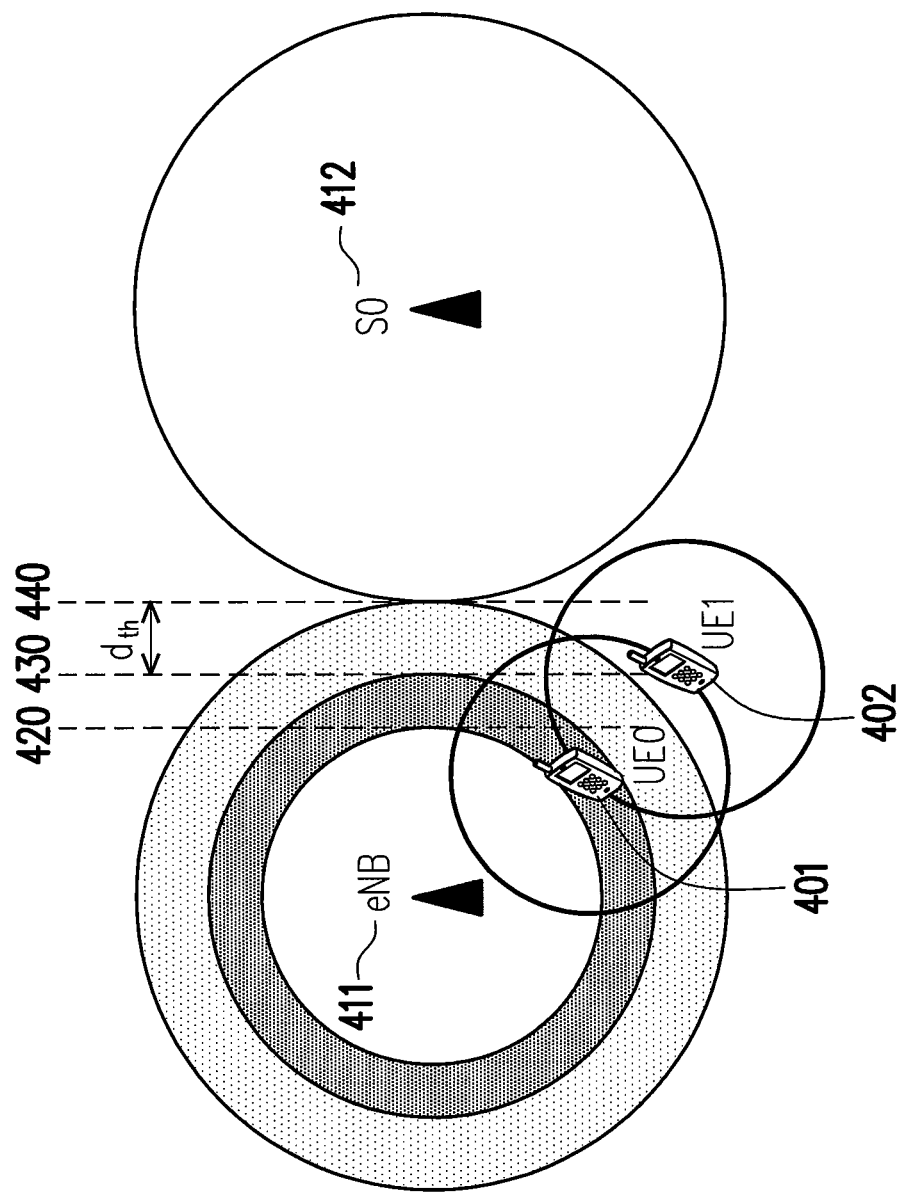
Figure 4C:
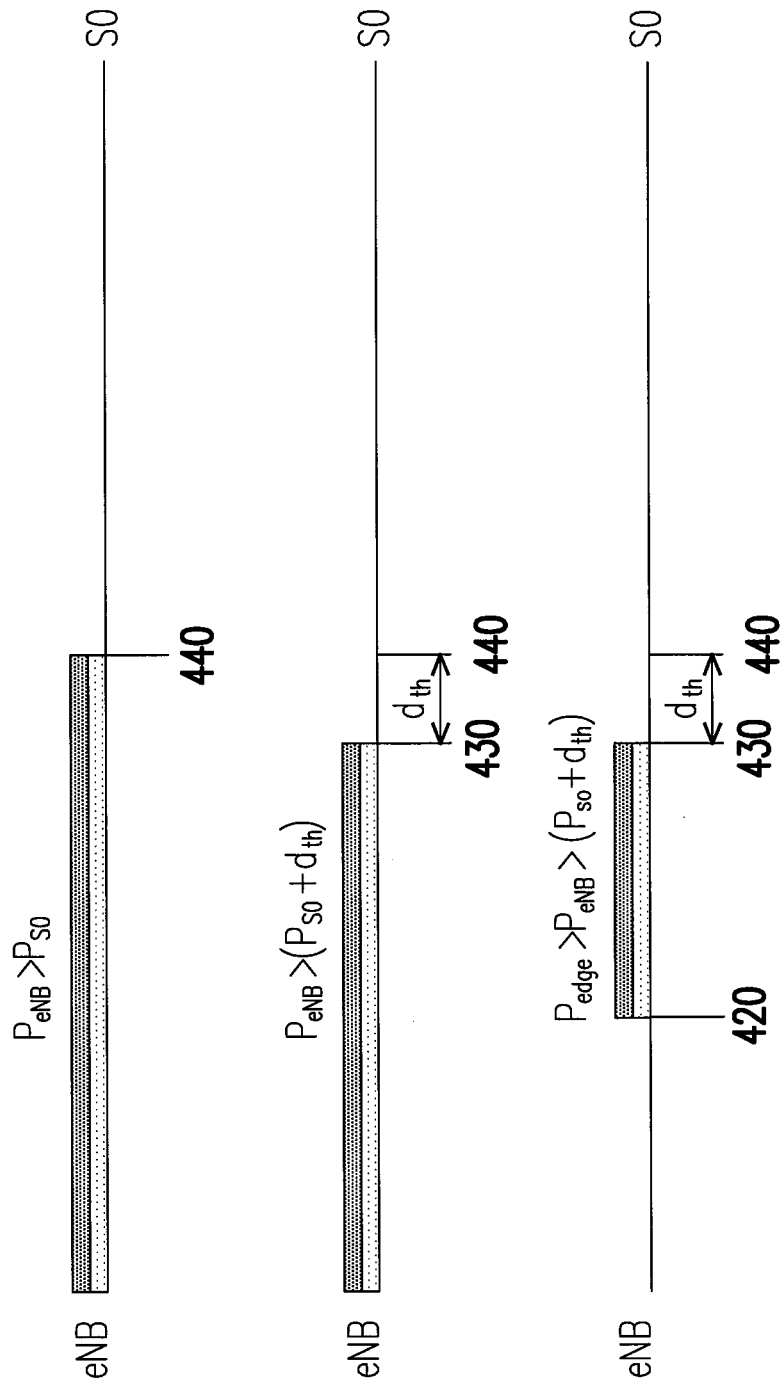

FIG. 4A~4C illustrates a first exemplary scenario of the proposed device to device synchronization method. FIG. 4A illustrates a signaling diagram of various D2D wireless network elements. In FIG. 4A, the eNB 411 would broadcast PSS/SSS having a power level that is represented as $P_{eNB}$ and attenuates as the PSS/SSS approaches UE0 401. Besides receiving $P_{eNB}$, the UE0 401 may also receive D2DSS0 which stands for a D2DSS coming from S0 412 and has a power level $P_{s0}$. The S0 412 may represent another synchronization source that has a different timing alignment information from the eNB 411 and could be another D2D device that is outside of the range of the eNB 411. The UE0 401 may also receive D2DSS1 which stands for a D2DSS coming from S1 413 having a power level $Ps_1$. The S1 413 may also represent another synchronization source that has a different timing alignment information from the eNB 411 and S0 412 and could be another D2D device that is outside of the range of eNB 411 and S0 412. UE0 401 may transmit to UE1 402 a D2DSSR which stands for a D2DSS generated by UE0 401. For the first exemplary scenario, the D2DSSR would be derived based on timing alignment information of the network, PSS/SSS.

FIG. 4B illustrates the first exemplary scenario with further details. For the first exemplary scenario, it is assumed for UE0 that $P_{eNB}>P_{s0}>P_{s1}$, that is, the UE0 401 is assumed to be closer to eNB 411 than S0 412, that is closer to UE0 401 than S1 413 (not shown). If $P_{eNB}$ experienced by UE0 is greater than a first power threshold indicated as $P_{th1}$, then UE0 401 would select eNB 411 as a synchronization source by which the UE0 401 may align its timing to. If $P_{eNB}$ experienced by UE0 401 is greater than the first edge power threshold, $P_{edge}$, then UE0 401 could be considered to be within the radius of eNB 411 to imaginary marker 420, and the UE 401 may not forward the timing information to other UEs. However, if $P_{eNB}$ experienced by UE0 401 is smaller than the first edge power threshold, then UE0 401 forward timing alignment information to UE1 402 based on conditions to be explained in the followings. If UE0 401 detects the condition of ($P_{eNB}-P_{S0})>d_{th}$, then UE0 401 would forward D2DSSR to UE1 402, and D2DSSR could be based on the timing alignment information from eNB 411 alone or the combined timings alignment information from eNB 411 and D2DSS0 from S0, where $d_{th}$ indicates the second edge power threshold. The $d_{th}$ is a predetermined power level threshold and stands for the timing forward function activation threshold. The number $d_{th}$ could be adjusted based on the reliability requirement of the network. In other words, if the network has a high reliability requirement, $d_{th}$ would be larger. By satisfying the condition of $P_{eNB} < P_{edge}$ and $(P_{eNB} - P_{S0}) > d_{th}$, this means that UE0 401 would be situated within the circle radius defined by the region between the imaginary marker 420 and the imaginary marker 430 of FIG. 4B in order to forward D2DSSR using time alignment information from the eNB 411. If $(P_{eNB} - P_{S0}) <= d_{th}$, eNB 411 may not forward the timing alignment information from the eNB 411, since the time alignment information could be considered unreliable.

FIG. 4C illustrates a cross section view of FIG. 4B. In the top graph, the imaginary marker 440 is the place where $P_{eNB} = P_{s0}$. As UE0 401 moves closer to the eNB 411, $P_{eNB}$ would be greater than $P_{s0}$. In the middle graph, the distance between eNB 411 and the marker 430 is the radius within which $P_{eNB} > (P_{S0} + d_{th})$. This means that when UE0 401 moves from the imaginary marker 430 to the imaginary marker 440, the power level of PSS/SSS would attenuate by $d_{th}$. In the bottom graph of FIG. 4C, the distance between imaginary marker 420 and imaginary marker 430 is the differential radius within which $P_{edge} > P_{eNB} > (P_{S0} + d_{th})$ is satisfied. This means that if UE0 401 is within the radius of eNB 411 and imaginary marker 430 but is outside of the radius of eNB 411 and imaginary marker 420, UE0 401 may forward timing alignment information of the eNB 411 in D2DSSR to UE1 402.

Figure 5:
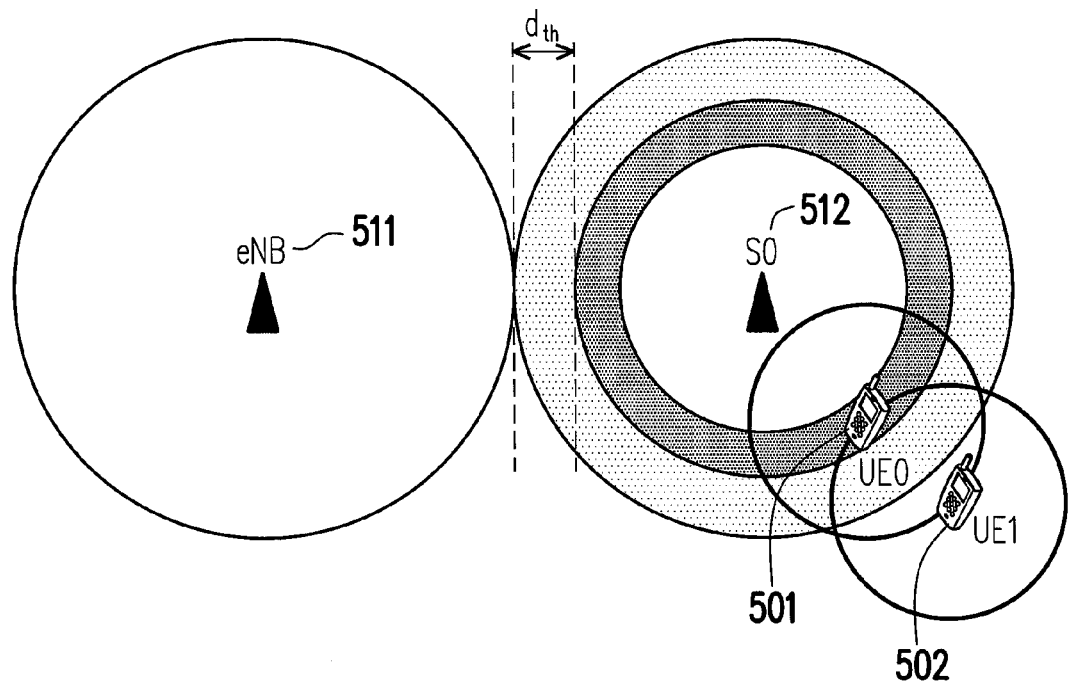
FIG. 5 illustrates a second exemplary scenario of the device to device synchronization method.
Figure 5:
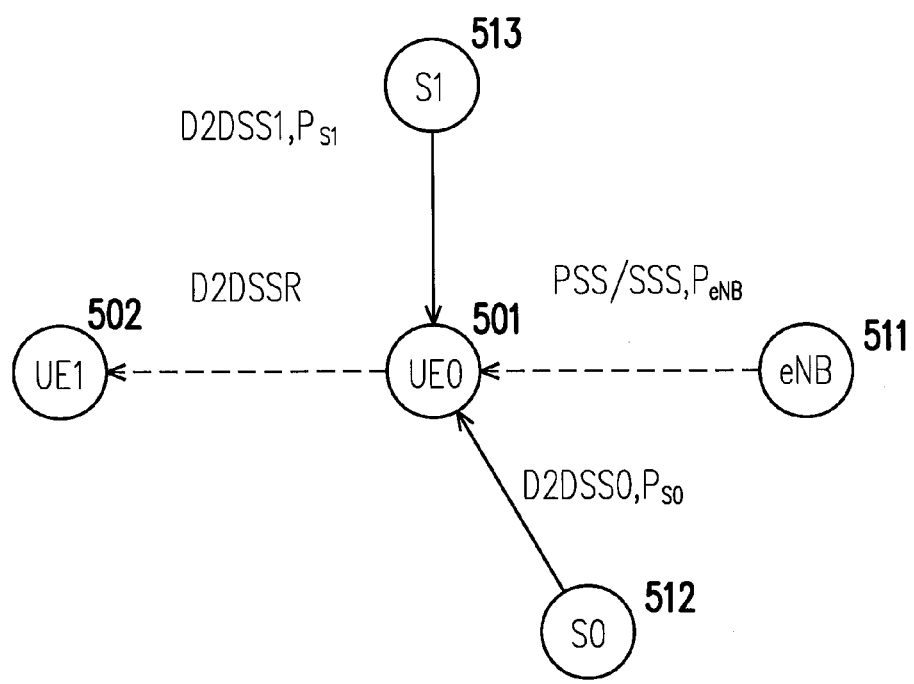

FIG. 5 illustrates a second exemplary scenario of the device to device synchronization method. For the second exemplary scenario, the UE0 501 is closer to the S0 512 than to the eNB 511. Therefore, if UE0 501 detects that $P_{eNB} >= P_{th1}$, UE0 501 would select timing from eNB 511 as eNB 511 would be considered to have higher priority although UE0 501 is closer to S0 512 then to eNB 511, where is $P_{th1}$ the first power threshold. UE0 501 would then synchronize its timing with PSS/SSS from eNB 511, but UE 501 may not forward the timing information to other UEs. However, if UE0 501 detects that $P_{eNB} < P_{th1}$ and $P_{S0} >= P_{th2}$, then UE0 501 would synchronize with timing information from S0 512, where $P_{th2}$ indicates a second power threshold. This means that UE0 501 might be too far away from eNB 511 and/or does not receive sufficient power from eNB 511, but UE0 501 would nevertheless receive sufficient power from S0 512 that the UE0 501 would be able to synchronize with S0 512.

As for the case when UE0 is situated around the edge of the coverage of S0 512, or in other words, $P_{S0}$ detected by UE0 501 is less than $P_{edge}$, the predetermined first edge power threshold, then if UE0 501 detects that $(P_{S0} - P_{eNB}) > d_{th}$, then UE0 would start to forward timing alignment information from S0 512 to other UEs that might be near or outside of the coverage of eNB 511 and S0 512 by transmitting D2DSSR with the timing of D2DSS0 or with the combined timings of D2DSS0 and eNB or with combined timings of all D2DSS that UE0 501 has received. The timing forward activation threshold, i.e. the second edge power threshold $d_{th}$, can be adjusted based on the reliability requirement of the overall D2D communication system.

Figure 6:
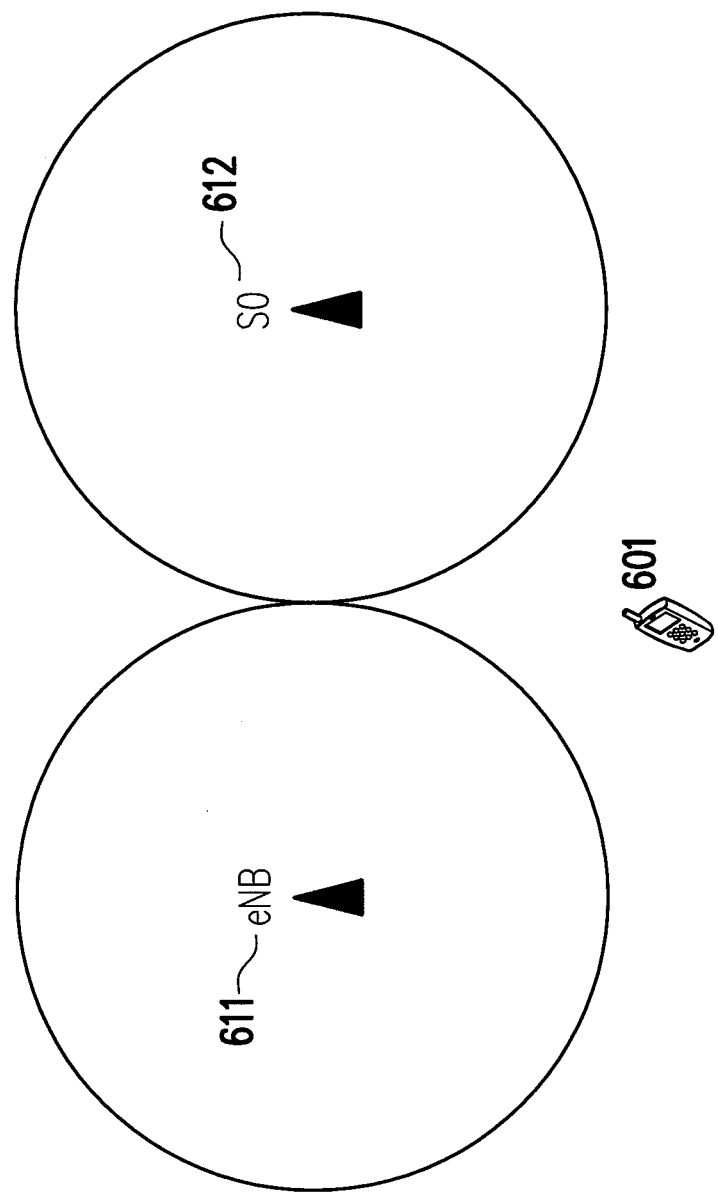
FIG. 6 illustrates a third exemplary scenario of the device to device synchronization method.

FIG. 6 illustrates a third exemplary scenario of the device to device synchronization method. For this exemplary scenario, when the UE0 601 detects that $P_{eNB}$, $P_{S0}$, and $P_{S1}$ received from eNB 611, S0 612, and S1 (not shown) respectively are all below predetermined power thresholds, i.e. $P_{eNB} < P_{th1}$ and $(P_{S0}, P_{S1}) < P_{th2}$, then UE0 601 is considered to be outside of the coverage of the eNB network and S0 612, where $P_{th1}$ is the first power threshold and $P_{th2}$ is the second power threshold. In this case, UE0 601 would not synchronize with the timing alignment information from any of the aforementioned synchronization sources. But instead, UE0 601 would transmit D2DSSR based on its own timing alignment information to other peer devices or D2D UEs that are within the range of UE0 601.

Figure 7:
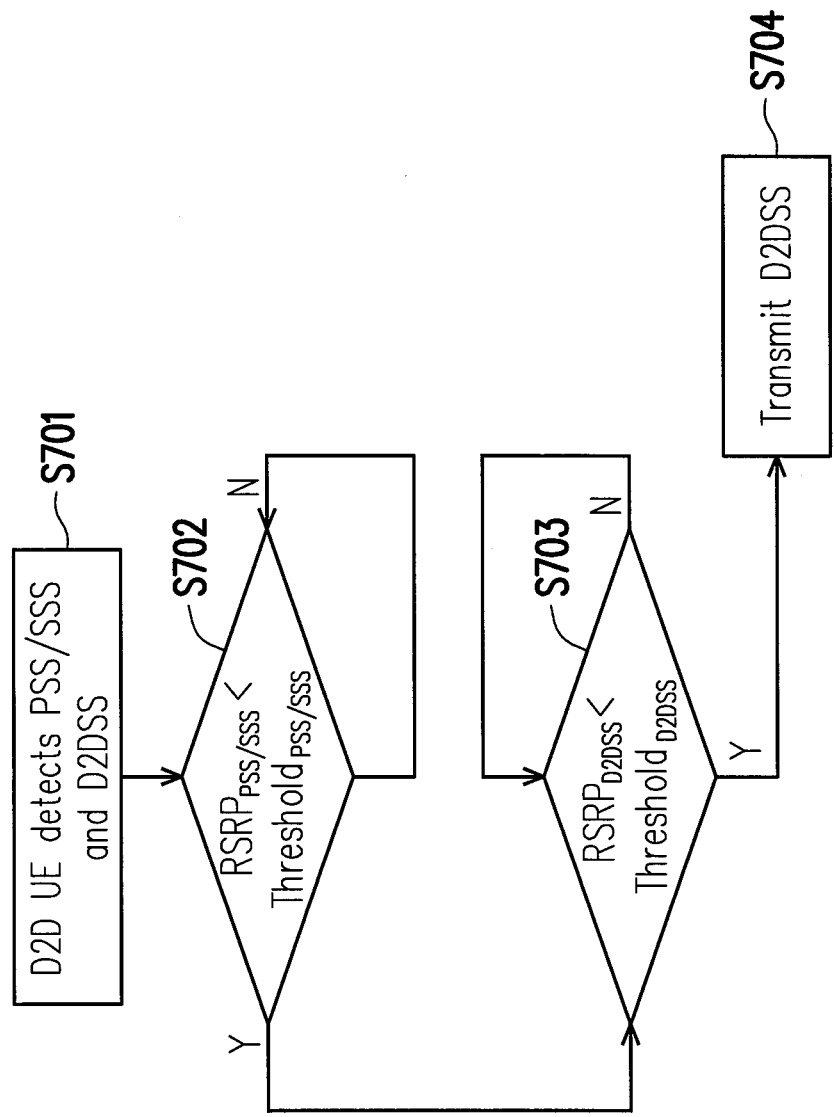
FIG. 7 illustrates a D2D synchronization signal (D2DSS) triggering flow chart in accordance with one of the exemplary embodiments of the present disclosure.

FIG. 7 is a D2D synchronization signal (D2DSS) triggering flow chart that illustrates the circumstances in which the aforementioned scenarios could be involved. It is assumed that the UE has received both PSS/SSS from a base station and at least one D2DSS from an external synchronization source. In step S701, it is assumed that a UE with D2D capability has detected PSS/SSS from at least one system information transmitted from a base station, and a UE with D2D capability has also detected the strongest D2DSS from at least one system information transmitted from a synchronization source. In step S702, the UE would determine whether it was detected that the RSRP of the PSS/SSS (RSRP$_{PSS/SSS}$) is below a predetermined PSS/SSS threshold (Threshold$_{PSS/SSS}$), where Threshold$_{PSS/SSS}$ is defined the same as $P_{th1}$. If the RSRP of the PSS/SSS is above a predetermined PSS/SSS threshold, then the above mentioned first exemplary scenario would be applied. If the RSRP of the PSS/SSS is below a predetermined PSS/SSS threshold, then step S703 will be executed. In step S703, the UE would determine whether the RSRP of the received D2DSS (RSRP$_{D2DSS}$) is below a predetermined D2DSS threshold (Threshold$_{D2DSS}$), where Threshold$_{D2DSS}$ is defined the same as $P_{th2}$. If the RSRP of the received D2DSS is above the predetermined D2DSS threshold, then the above mentioned second exemplary scenario would be applied. If the RSRP of the received D2DSS is below the predetermined D2DSS threshold, then step S704 would be executed as the above mentioned third exemplary scenario would be applied. In step S704, the UE would transmit a D2DSS based on the timing alignment information that is native to the UE.

Figure 8:
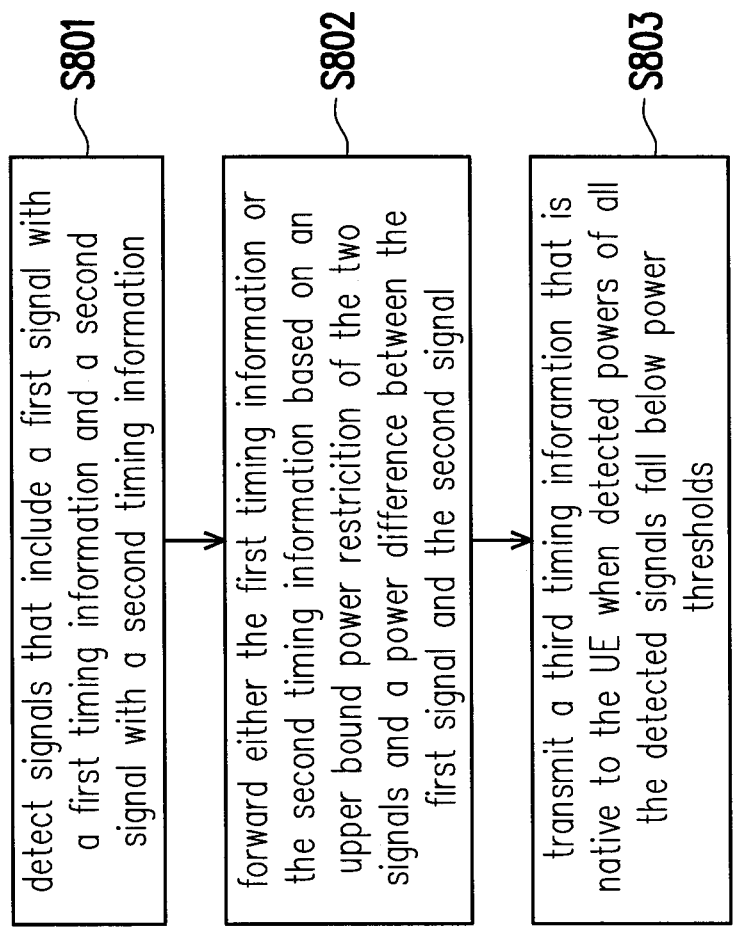
FIG. 8 is a flow chart that summarizes the proposed device to device synchronization method.

FIG. 8 is a flow chart that summarizes the proposed device to device synchronization method from the perspective of a UE with D2D capability. In step S801, a UE would receive detected signals from a receiver, and the UE would obtain, from the detected signals, a first signal that has a first timing information as well as a second signal that has a second timing information. In step S802, the UE would determine whether to forward the first timing information or the second timing information based on an upper bound power restriction of the first signal and the second signal and a power difference between the first signal and the second signal. In step S803, the UE would determine whether to transmit a third timing information that is inherent of the UE based on whether all detected signals are below power thresholds.

In one of the exemplary embodiments, the first timing information may include a primary synchronization signal (PSS) and a secondary synchronization signal (SSS), and the UE may synchronize to the first timing information of the first signal if the first signal is above a first power threshold and not synchronize to the first timing information of the first signal if the first signal is below the first power threshold.

In one of the exemplary embodiments, the UE may synchronize to the second signal if the second signal is above a second power threshold and the first signal is below the first power threshold.

In one of the exemplary embodiments, the UE may transmit the third timing information only if both the first signal is below the first power threshold and the second signal is below the second power threshold.

In one of the exemplary embodiments, the UE may forward the first timing information if the first signal is below a first edge power threshold and not forwarding the first timing information if the first signal is above the first edge power threshold.

In one of the exemplary embodiments, the UE may forward the second timing information if a second signal is below the first edge power threshold and not forward the second timing information if the second signal is above the first edge power threshold.

In one of the exemplary embodiments, the UE may forward the first timing information if the first signal has higher power than the second signal by a second edge power threshold and not forwarding the first timing information if the first signal does not have higher power than the second signal by the second edge power threshold.

In one of the exemplary embodiments, the UE may forward the second timing information if the second signal has higher power than the first signal by the second edge power threshold and not forwarding the second timing information if the second signal does not have higher power than the first signal by the second edge power threshold.

In one of the exemplary embodiments, the above mentioned first and the second edge power thresholds are adjustable.

Figure 9:
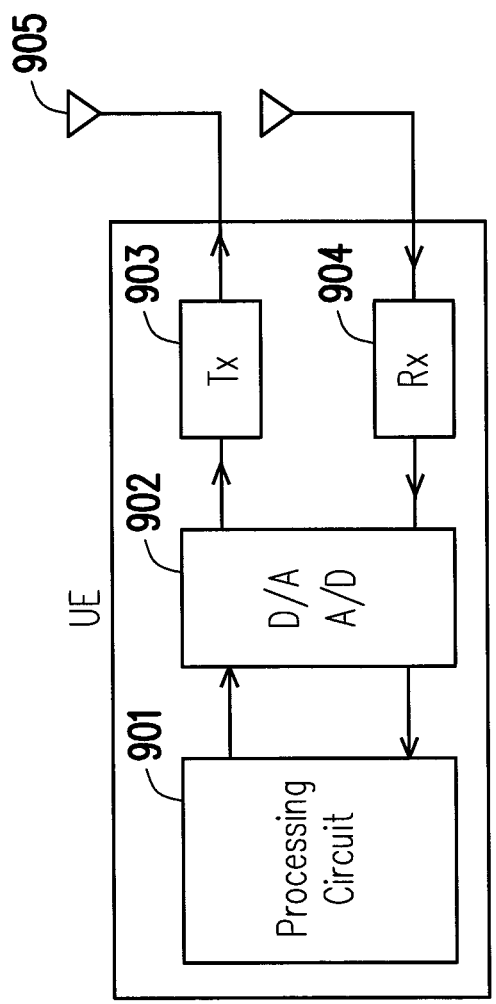
FIG. 9 illustrates an exemplary UE that executes the proposed device to device synchronization method in terms of a functional block diagram.

FIG. 9 illustrates an exemplary UE in terms of a functional block diagram. The UE of FIG. 9 would correspond to the UE of FIG. 8 so as to be able to execute the proposed device to device synchronization method in terms of a functional block diagram. The UE contains at least but not limited to a processing circuit 901, coupled to an analog-to-digital (A/D)/digital-to-analog (D/A) converter 902, a transmitter 903, a receiver 904, and one or more antenna units 905. The transmitter 903 would transmit signals wirelessly, and the receiver 904 would receive signals wirelessly. The transmitter 903 and receiver 904 may also perform operations such as low noise amplifying, impedance matching, frequency mixing, up or down frequency conversion, filtering, amplifying, and so like. The (A/D)/(D/A) converter 902 is configured to convert from an analog signal format from the receiver 904 to a digital signal format that could be digitally processed by the processing circuit 901. On the other hand, the (A/D)/(D/A) converter 902 may receive signals from the processing circuit 901 and convert the signal of a digital signal format to an analog signal format to be transmitted to the transmitter 903. The processing circuit 901 is configured to process digital signal and to perform procedures of the proposed D2D synchronization method in accordance with the aforementioned exemplary embodiments of the present disclosure. Also, the processing circuit 901 may optionally be coupled to a non-transitory storage medium to store programming codes, device configurations, a codebook, buffered or permanent data, and so forth. The functions of the processing circuit 901 could be implemented by using programmable units such as a micro-processor, a micro-controller, a DSP chips, FPGA, etc. The functions of the processing circuit 901 may also be implemented with separate electronic devices or ICs, and the functions performed by the processing circuit may be implemented within the domain of either hardware or software.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A device to device (D2D) synchronization method that is applicable to a user equipment, the method comprising:
   receiving detected signals from a receiver;
   obtaining from the detected signals a first signal having a first timing information and a second signal having a second timing information;
   determining whether to forward the first timing information or the second timing information based on an upper bound power restriction of the first signal and the second signal and a power difference between the first signal and the second signal; and
   determining whether to transmit a third timing information that is inherent of the UE based on whether the first signal and the second signal are below power thresholds.

2. The method of claim 1, wherein the first timing information comprises a primary synchronization signal (PSS) and a secondary synchronization signal (SSS), claim 1 further comprising:
   synchronizing to the first timing information of the first signal if the first signal is above a first power threshold; and
   not synchronizing to the first timing information of the first signal if the first signal is below the first power threshold.

3. The method of claim 2 further comprising:
   forwarding the first timing information if the first signal is below a first edge power threshold; and not forwarding the first timing information if the first signal is above the first edge power threshold.

4. The method of claim 3 further comprising:
forwarding the first timing information if the first signal has higher power than the second signal by a second edge power threshold; and
not forwarding the first timing information if the first signal does not have higher power than the second signal by the second edge power threshold.

5. The method of claim 4, wherein both the first and the second edge power thresholds are adjustable.

6. The method of claim 1 further comprising:
synchronizing to the second signal if the second signal is above a second power threshold and the first signal is below the first power threshold.

7. The method of claim 6 further comprising:
forwarding the second timing information if a second signal is below the first edge power threshold; and
not forward the second timing information if the second signal is above the first edge power threshold.

8. The method of claim 7 further comprising:
forwarding the second timing information if the second signal has higher power than the first signal by the second edge power threshold; and
not forwarding the second timing information if the second signal does not have higher power than the first signal by the second edge power threshold.

9. The method of claim 1 further comprising:
transmitting the third timing information only if both the first signal is below the first power threshold and the second signal is below the second power threshold.

10. The method of claim 1, wherein the second timing information comprises a first D2D synchronization signal (D2DSS), and the third timing information comprises a second D2D synchronization signal (D2DSS).

11. A user equipment (UE) comprising:
a transmitter for transmitting wireless signal;
a receiver for receiving wireless signal; and
a processing circuit coupled to the at least one transmitter and the least one receiver and is configured for:
receiving detected signals from the receiver;
obtaining from the detected signals a first signal having a first timing information and a second signal having a second timing information;
forwarding the first timing information or the second timing information based on an upper bound power restriction of the first signal and the second signal and a power difference between the first signal and the second signal; and transmitting through the transmitter a third timing information that is inherent to the UE in response to all detected signals being below power thresholds.

12. The UE of claim 11, wherein the first signal comprises a primary synchronization signal (PSS) and a secondary synchronization signal (SSS), the processing circuit is further configured for:
synchronizing to the first timing information of the first signal if the first signal is above a first power threshold; and
not synchronizing to the first timing information of the first signal if the first signal is below the first power threshold.

13. The UE of claim 12, wherein the processing circuit is further configured for:
forwarding the first timing information via the transmitter and the receiver if the first signal is below a first edge power threshold; and
not forwarding the first timing information via the transmitter and the receiver if the first signal is above the first edge power threshold.

14. The UE of claim 13, wherein the processing circuit further configured for:
forwarding the first timing information via the transmitter and the receiver if the first signal has higher power than the second signal by a second edge power threshold; and
not forwarding the first timing information via the transmitter and the receiver if the first signal does not have higher power than the second signal by the second edge power threshold.

15. The UE of claim 14, wherein both the first and the second edge power thresholds are adjustable.

16. The UE of claim 11, wherein the processing circuit is further configured for:
synchronizing to the second signal if the second signal is above a second power threshold and the first signal is below the first power threshold.

17. The UE of claim 16, wherein the processing circuit is further configured for:
forwarding the second timing information via the transmitter and the receiver if the second signal is below the first edge power threshold; and
not forward the second timing information via the transmitter and the receiver if the second signal is above the first edge power threshold.

18. The UE of claim 17, wherein the processing circuit is further configured for:
forwarding the second timing information via the transmitter and the receiver if the second signal has higher power than the first signal by the second edge power threshold; and
not forwarding the second timing information via the transmitter and the receiver if the second signal does not have higher power than the first signal by the second edge power threshold.

19. The UE of claim 11, wherein the processing circuit is further configured for:
transmitting the third timing information only if both the first signal is below the first power threshold and the second signal is below the second power threshold.

20. The UE of claim 11, wherein the second timing information comprises a first D2D synchronization signal (D2DSS), and the third timing information comprises a second D2D synchronization signal (D2DSS).

* * * * *